July 6, 1965  E. PLUMAT  3,193,365
PROCESS AND APPARATUS FOR DRAWING GLASS IN SHEET FORM
Filed Aug. 30, 1960  2 Sheets-Sheet 1
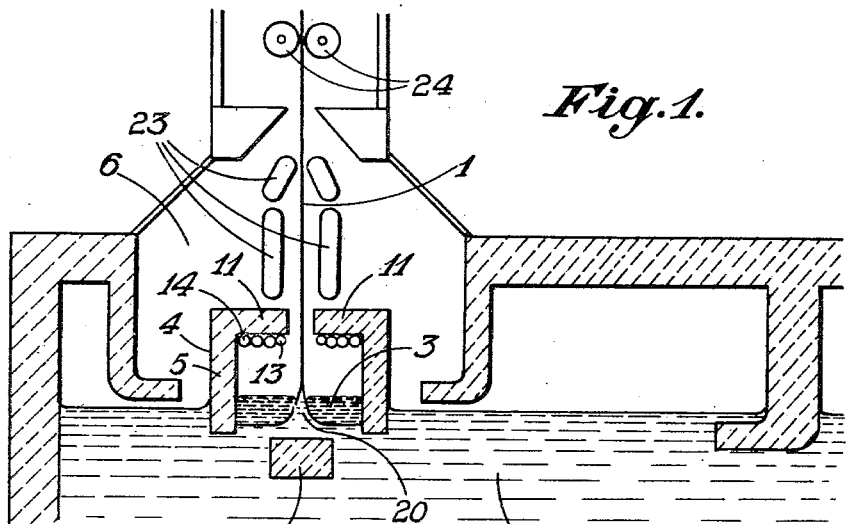
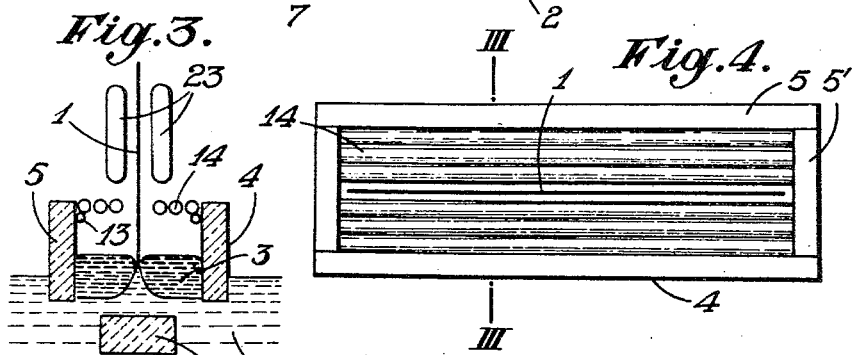
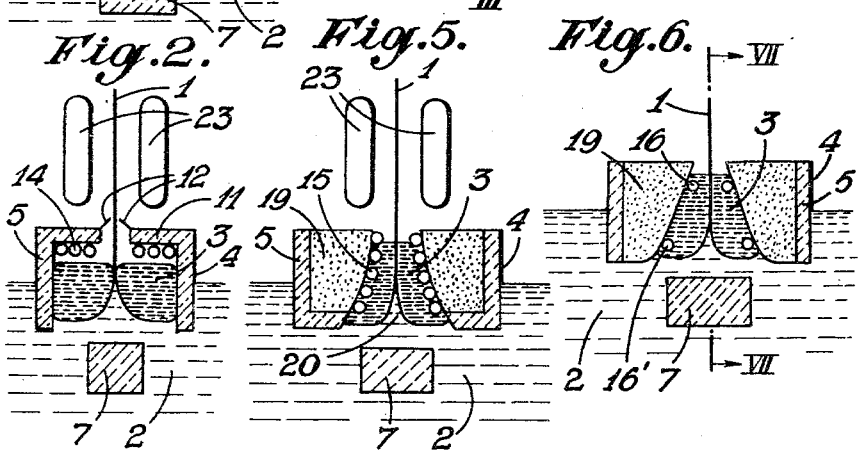
INVENTOR
EMILE PLUMAT
BY
Corey, Hart & Stemple
ATTORNEYS

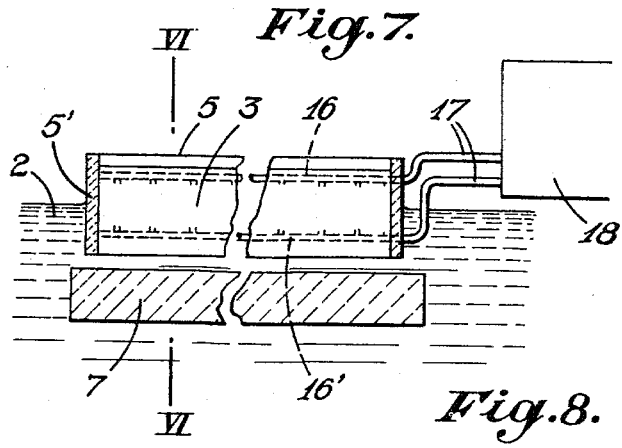
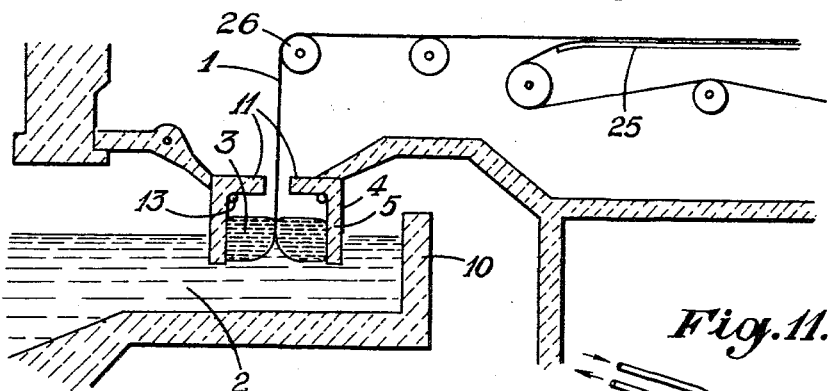
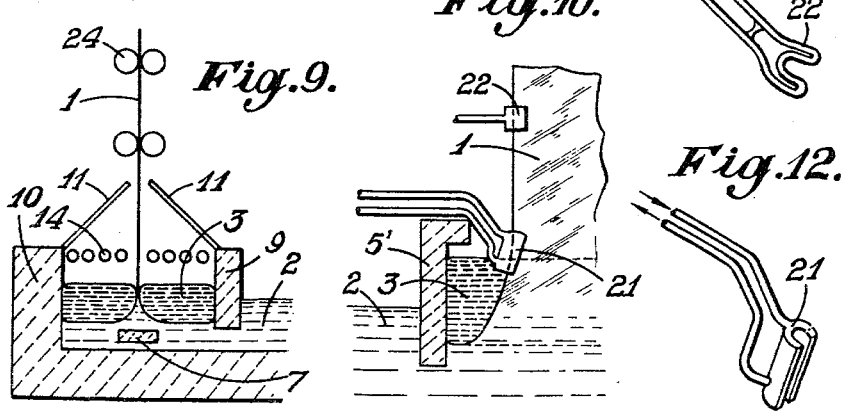

United States Patent Office 3,193,365
Patented July 6, 1965

3,193,365
PROCESS AND APPARATUS FOR DRAWING
GLASS IN SHEET FORM
Emile Plumat, Gilly, Belgium, assignor to Union des
Verreries Mecaniques Belges, Societe Anonyme,
Charleroi, Belgium, a company of Belgium
Filed Aug. 30, 1960, Ser. No. 52,821
Claims priority, application Belgium, Sept. 9, 1959,
461,844, Patent 582,512
11 Claims. (Cl. 65—23)

The present invention relates to a process and an apparatus for drawing glass in sheet form from a bath of molten glass.

In the known drawing processes, the glass sheet is drawn in a chamber whose walls are relatively cold and in which are disposed cooling members which assist in the congealment of the glass. The said walls and members set up cold air currents which tend to proceed towards the bottom of the drawing chamber and thereafter to rise on either side along the glass sheet being formed, thus causing modifications to the surface of the drawn glass, notably the formation of streaks.

The process according to the invention has for its object to obviate these disadvantages while protecting the glass sheet being formed from the action of the gas currents. To this end, the drawing is effected from the bottom upwards through molten materials which are less dense than glass and which cover the glass bath at the drawing station. These molten materials less dense than glass are contained in a casing having an open bottom, which is partially immersed in the glass bath and comprises means for influencing the drawing of the glass through the said molten materials and for protecting the latter against oxidation or any other modification.

The molten materials less dense than glass comprise the substances which are inert to molten glass and advantageously have a density lower than 2.5 and a melting point lower than 900° C. They are maintained in the chamber at a temperature below that of the molten glass bath. These materials may consist of metal and then advantageously form part of a group of metals comprising aluminium (of which the density in the liquid state is of the order of 2.4) and magnesium, as also their alloys with one another and with other metals, such as magnalium or the alloys known under the name "Dowmetals." However, they may also be inorganic and then preferably comprise eutectic or non-eutectic mixtures of salts of alkali, alkaline-earth or other metals.

In accordance with a first embodiment of the process, the molten materials less dense than glass form in the casing a bed of such height as to cover only the "gather" of the glass sheet being formed, the latter being exposed to cooling means within the chamber, so as to leave the latter in a state of surface congealment such that it is not modified by the gas currents of the drawing chamber.

In accordance with another embodiment, the materials less dense than glass form a bed of such height that the drawn glass sheet leaving the said bed is already in a sufficient state of surface congealment to resist the gas currents of the drawing chamber.

In both cases, a glass is obtained which has a fire finish and the surface of which remains absolutely plane. On leaving the chamber, the glass may be cooled by the usual means to a temperature at which the congealment is sufficiently advanced to enable the rolls of the drawing machine to take it up without damaging it.

In the use of a thin bed of molten metal less dense than glass, the latter may be protected against oxidation by an inert or reducing gas introduced into the interior of the casing, such as carbon monoxide, while when the bed of molten glass employed is sufficiently thick to effect the surface congealment of the glass sheet within the said bed, the protection of the molten metal against oxidation may be effected either by introducing an inert or reducing gas into the casing, or by covering its surface with a solid reducing substance, such as powdered carbon, silicon or the like. The bed of molten metals less dense than glass is advantageously protected from oxidation, regardless of the height of the bed, by covering its surface with a molten inorganic compound of lower density and melting point than the metal.

The process described is readily applicable to the various sheet glass drawing systems known, for example, in the Foucault, Pittsburgh or Libbey-Owens processes.

The apparatus for carrying out the described process comprises a floating, suspended or supported refractory casing of generally parallelepipedic form, of which the walls are partially immersed in the glass bath, define in the drawing chamber an enclosed spaced containing the molten materials less dense than glass and protect the drawn sheet from the gas currents existing in the drawing chamber.

The said casing is advantageously provided on its upper face with screens defining between them a clearance of the passage of the glass sheet. There may be disposed below the said screens banks of gas jets which feed into the said casing an inert or reducing gas, for example carbon monoxide, for preventing oxidation of the layer of molten metal serving as the material less dense than glass.

The casing comprises ducts through which there is passed a cooling fluid acting on the molten materials less dense than glass. The said ducts may be disposed below the screens by which the chamber is closed, so as to act on the surface of the molten materials, as also on the glass sheet which has left the said materials. In this case, the ducts may advantageously themselves form the screens closing the casing. The cooling ducts, however, may be submerged in the molten materials less dense than glass. This arrangement is particularly suitable when the beds of molten materials less dense than glass are of sufficient thickness to cause the sheet to congeal on the surface within the bed.

In one variant, the casing is provided with ducts for extracting from the chamber the molten materials less dense than glass which have been superheated by the supply of heat emanating from the drawing glass, for feeding them into a cooler and for returning them in the cooled state into the casing.

The cooling ducts or the ducts for the circulation of the molten materials less dense than glass which proceed to the cooler and return therefrom submerged in the said molten materials are preferably mounted on heat-insulating packings disposed within the casing against the walls of the latter in order to render the temperature level within the casing independent of that in the drawing chamber outside the casing. The inner faces of the heat insulating packings are advantageously inclined one towards the other for the purpose of providing the receptacle for the molten materials less dense than glass with a cross-section which substantially follows that of the "gather." This arrangement makes it possible to reduce the necessary quantity of materials less dense than glass and to reduce the surface of these materials exposed to oxidation.

The casing comprises in addition a number of accessory means intended to control or to facilitate the drawing of the glass sheet through the bed of materials less dense than glass. Thus, the casing is provided with a means for heating the molten materials less dense than glass, for example at the beginning of a drawing operation. This heating means preferably consists of electrical resistors submerged in the said materials. Moreover, the casing comprises valves for closing the clearance for the passage of the glass sheet in order to protect the molten materials less dense than glass against oxidation when the drawing apparatus is not in operation, and it obviously comprises means for determining the temperature existing in the interior. Along its smaller sides, the casing is provided with means for stabilising the edge of the glass sheets undergoing drawing, such as cooled forks known per se. Finally, the casing is disposed in a drawing chamber which is provided with the usual means for the additional cooling and the conveyance of the drawn sheet leaving the casing.

The accompanying drawings diagrammatically illustrate by way of example a number of embodiments of the invention.

FIGURE 1 is a vertical section through a glass sheet drawing apparatus provided with a device according to the invention, FIGURES 2, 3 and 5 show various constructional forms of the said device in vertical section.

FIGURE 4 is a plan view of the device according to FIGURE 3, which latter is a section along the line III—III of FIGURE 4, FIGURES 6 and 7 are vertical sections, FIGURE 6 along the line VI—VI of FIGURE 7, and FIGURE 7 along the line VII—VII of FIGURE 6, through a device for cooling the molten materials less dense than glass in a separate cooler, FIGURE 8 shows a device according to the invention applied to a drawing apparatus in which the glass sheet is horizontally moved, FIGURE 9 illustrates a particular constructional form of the device, FIGURE 10 shows a cooled fork for the stabilisation of the edges of the drawn sheet, mounted on the device, and FIGURES 11 and 12 are views in perspective of two forks for the stabilisation of the edges of the drawing sheet.

The devices which will hereinafter be described serve for carrying out a process of vertically drawing a glass sheet 1 from a molten glass bath 2 through a bed 3 of molten materials less dense than glass and floating on the surface of the glass but within a casing 4 open at the bottom.

The casing 4 here consists of walls 5 and 5' (FIGURE 4) partially immersed in the glass bath and are assembled in the form of a parallelepiped in the drawing chamber 6 (FIGURE 1) above the submerged bar 7 called the "Débiteuse," with which most drawing apparatus are provided. The walls consist of refractory material of lower specific gravity than the molten glass, so that the casing can float on the bath (FIGURES 1 to 6). However, the casing may be suspended, for example from an arched roof, or it may be maintained, for example, in the manner of the bar 9 (FIGURE 9), which may be let into the side walls of the tank associated with the melting furnace to receive the drawing station, and which, together with the side walls and the front wall 10 of the said tank, constitutes the enclosed space retaining the molten materials 3 less dense than glass, through which the drawing is effected. At the top, the casing is advantageously closed by screens 11 defining a clearance through which the glass sheet 1 passes. The said screens may be fixed (FIGURES 1, 2 and 8) and may then comprise flaps 12 (FIGURE 2) by means of which the casing can be completely closed when the drawing station is not in operation, with the object of protecting the molten materials 3 against oxidation. However, the screens may be movable (FIGURE 9) and may be downwardly hinged when the drawing apparatus is stopped. There may be disposed within the enclosed space defined by the casing 4 and the screens 11 banks of gas jets 13 (FIGURES 1 and 8) feeding into the said space a gas which sets up therein a neutral or reducing atmosphere for protecting the molten materials 3 against oxidation.

The enclosed space is also provided with cooling ducts 14 disposed, for example, below the screens 11 (FIGURE 2) or even constituting the screens (FIGURES 3 and 4) taking the place of the screens 11. In other constructional forms, the casing comprises ducts submerged in the molten materials 3, such as the cooling ducts 15 (FIGURE 5), or perforated or slotted ducts 16 and 16' (FIGURES 6 and 7) connected by ducts 17 to a heat exchanger 18. The latter arrangement makes it possible to extract superheated material from the bottom of the bed of molten materials 3 through the duct 16', to feed this material through 17 into the heat exchanger 18 in order to cool it therein, and to return it into the bed of molten materials 3, into the top of which there leads the ducts 16.

The ducts 15 or the perforated slotted ducts 16 are advantageously disposed against a layer of heat-insulating material 19, of which the cross-section is such that the bed of molten materials 3 approximately adapts itself to the shape of the "gather" 20 (FIGURES 1, 5 and 6).

Mounted on the smaller sides 5' of the casing are cooled forks 21, 22 (FIGURES 10 and 11 and 12), serving in known manner to stabilise the edges of the glass sheet being drawn. The casing is in addition provided with accessory means, such as electrical resistors, for heating the molten materials at the beginning of an operation or with thermocouples to control the temperatures. These means are not shown in the figures.

The process according to the invention has for its object to draw a glass sheet in the absence of the air currents existing in the drawing chamber 6 (FIGURE 1). For this purpose, the glass sheet undergoes a first cooling within the casing 4 and leaves the latter in a state of surface congealment sufficient to prevent any impairment of its surface by currents of air produced in the drawing chamber by the usual cooling means 23, which are intended to impart to the sheet the necesasry consistency to enable it to be taken up by the rolls 24 (FIGURE 1), or to be deposited on the covering annealing table 25 after having been horizontally deflected by the roll 26 (FIGURE 8).

In accordance with a first embodiment of the process, the first cooling of the sheet 1 within the casing 4 is effected by co-operation of a bed of molten materials 3 of small height covering approximately the "gather" 20, and cooling tubes 14 (FIGURES 1 and 3), which effect in addition the cooling of the molten materials 3, the temperature of which must be kept lower than that of the glass bath 2.

In accordance with another embodiment of the process, the bed of molten materials is given a greater height, so that the congealment of the glass sheet being formed takes place essentially within this bed. The cooling of the molten materials is then effected either by ducts 14 (FIGURE 2) or by ducts 15 (FIGURE 5) submerged in the molten materials, or by means of the perforated or slotted ducts 16' and their return through the duct 16 after having been subjected to the necessary cooling in the heat exchanger 18 (FIGURES 6 and 7).

In all cases, a completely flat glass sheet is obtained, the surfaces of which have no flaws and which have a fine finish.

Naturally, the invention is not limited to the constructional forms which have been described and illustrated by way of example, and modifications may be made thereto without departing from its scope.

I claim:

1. A process for drawing sheet glass from a molten glass bath so as to protect the sheet being formed from the cold ambient gas currents in the drawing chamber that are capable of disturbing the required thermal homogeneity of the glass in such sheet, comprising drawing the glass in sheet form from the glass bath upwardly through a mass of material non-adherent to glass and capable of protecting the glass while it is being drawn therethrough against said ambient gas currents, the material in said mass being inert to molten glass and having a density less than that of the molten glass, and said mass of material floating as a liquid layer on the glass bath so as to cover the area thereof from which the glass sheet is drawn at the drawing station and being of sufficient depth to cover substantially the gather from which the sheet is formed, the molten glass drawn upwardly through said mass of material being in direct contact with such material during its passage through such mass, and said liquid layer of material shielding the molten glass being drawn therethrough against said cold air currents and increasing the rate of surface congealment of the glass sheet so as to reduce the effects of such cold air currents thereon.

2. A process such as defined in claim 1, in which said floating mass of material is contained in a chamber of given horizontal area and is in communication at its bottom with the glass bath, and introducing into such chamber matter capable of maintaining said mass of material therein in condition suitable for such shielding action and for effecting such surface congealment action on the glass.

3. A process such as defined in claim 1, in which said mass of material is constituted of metallic matter selected from that group of metals comprising aluminum and magnesium and alloys of aluminum and magnesium.

4. A process such as defined in claim 1, in which said mass of material is constituted of a mixture of metal salts.

5. A process such as claimed in claim 2, in which said matter introduced into said chamber is a cooling medium to the cooling action of which the glass sheet is exposed as it travels through such chamber to the exit end thereof, to bring the glass sheet to a state of surface congealment such that it can no longer be substantially modified by the cold air currents in the drawing chamber.

6. A process such as defined in claim 2 in which said matter introduced into said chamber is directed onto said mass of material so as to form a protective cover therefor.

7. A process such as defined in claim 6, in which said mass of material is constituted of metallic matter in a molten condition, and in which said covering matter is a molten inorganic compound having lower density and a lower melting point than said metallic matter.

8. Apparatus for drawing sheet glass from a molten glass bath and through a drawing chamber, comprising a mass of material floating as a liquid layer on the glass bath at a given portion thereof so as to cover the area thereof from which the glass sheet is drawn, means for maintaining said material floating on said glass bath at said given portion as a liquid layer of substantial height and of a length greater than the width of said glass sheet, and means for drawing glass in sheet form from the area of the glass bath covered by said mass of material and upwardly through said mass of material and into the drawing chamber, the material of said mass being inert and non-adherent to molten glass and being in direct contact with the glass sheet drawn therethrough, and capable of shielding the glass with which it is in contact against cold air currents in the drawing chamber and of increasing the rate of surface congealment of such glass sheet so as to reduce the effects of such cold air currents thereon.

9. Apparatus such as defined in claim 8, in which said maintaining means defines a localized chamber area within the confines of the drawing chamber and extending for a given height above the surface of said glass bath, the bottom of said localized chamber area being open to said glass bath, and including means closing the top of said localized chamber area and providing an elongated opening for the passage of the glass sheet, a plurality of discharge outlets disposed in said chamber area above said mass of material therein and directed on the latter, and means for conducting matter to said outlets to be discharged toward said mass.

10. Apparatus such as defined in claim 8, in which said maintaining means defines a localized chamber area within the confines of the drawing chamber and extending for a given height above the surface of said glass bath, the bottom of said localized chamber area being open to said glass bath, and including ducts provided in said maintaining means for extracting such of said mass of material which has been superheated by the supply of heat emanating from the drawing of the glass, a cooling unit connected to said ducts for cooling the material extracted from said mass, and means for returning the cooled material to said maintaining means.

11. Apparatus such as defined in claim 8, including heating means provided in said maintaining means to heat said mass of material.

References Cited by the Examiner

UNITED STATES PATENTS

| | | | |
|---|---|---|---|
| 1,422,036 | 7/22 | Crowley et al. | 65—26 |
| 1,941,392 | 12/33 | Engels | 65—45 |
| 2,363,695 | 11/44 | Ruppik | 22—241 |
| 2,478,090 | 8/49 | Devol | 65—182 X |
| 2,741,877 | 4/56 | Dobrovolny | 65—182 X |
| 2,754,559 | 7/56 | Fromson | 22—241 |
| 2,968,892 | 1/61 | Pilkington | 65—65 |
| 2,968,893 | 1/61 | Pilkington | 65—349 |

DONALL H. SYLVESTER, *Primary Examiner.*

ARTHUR P. KENT, WILLIAM B. KNIGHT,
*Examiners.*